United States Patent [19]

Schotz

[11] Patent Number: 5,265,154
[45] Date of Patent: Nov. 23, 1993

[54] TELEPHONE CONTROLLER APPARATUS

[76] Inventor: Larry Schotz, 14207 Thorngate Rd., Maquon, Wis. 53092

[21] Appl. No.: 609,257

[22] Filed: Nov. 5, 1990

[51] Int. Cl.$^5$ .................................. H04M 11/00
[52] U.S. Cl. ................... 379/102; 379/184; 379/387
[58] Field of Search ............... 379/190, 199, 171, 165, 379/387, 372, 373, 102, 179, 201, 184, 200; 379/103, 104, 194, 442; 340/310 R, 310 A

[56] References Cited

U.S. PATENT DOCUMENTS

| | | | |
|---|---|---|---|
| 3,949,172 | 4/1976 | Brown et al. | 379/387 |
| 3,967,076 | 6/1976 | Balzer | 379/201 |
| 4,070,549 | 1/1978 | Baker | 379/102 |
| 4,405,839 | 9/1983 | Groff | 379/188 |
| 4,418,244 | 11/1983 | Edgar | 379/102 |
| 4,418,333 | 11/1983 | Schwarzbach et al. | 340/310 A |
| 4,459,434 | 7/1984 | Benning et al. | 379/102 |
| 4,480,154 | 10/1984 | Klee | 379/373 |
| 4,538,031 | 8/1985 | Benning et al. | 379/103 |
| 4,703,499 | 10/1987 | Fossas et al. | 379/387 |
| 4,755,792 | 7/1988 | Pezzolo et al. | 340/310 R |
| 4,782,322 | 11/1988 | Lechner et al. | 340/310 R |
| 4,899,372 | 2/1990 | Wahi et al. | 379/387 |
| 4,924,499 | 5/1990 | Serby | 379/373 |
| 4,975,943 | 12/1990 | Weber et al. | 379/200 |
| 5,031,082 | 7/1991 | Bierend | 340/310 A |
| 5,090,052 | 2/1992 | Nakajima et al. | 379/98 |

Primary Examiner—Wing F. Chan
Attorney, Agent, or Firm—Curtis, Morris & Safford

[57] ABSTRACT

Apparatus for enabling or disabling a selected telephone. A control signal having a unique predetermined frequency, which corresponds to a desired state of the selected telephone, is transmitted from a transmitter through standard telephone lines. The telephone is connected to a receiver, having one of a plurality of resonant circuits each tuned to one of the unique predetermined frequencies, which receives the control signal. When the frequency of the control signal matches the tuned frequency of a resonant circuit, the receiver connects or disconnects accordingly the selected telephone from the telephone lines thereby enabling or disabling, respectively, the selected telephone.

21 Claims, 5 Drawing Sheets

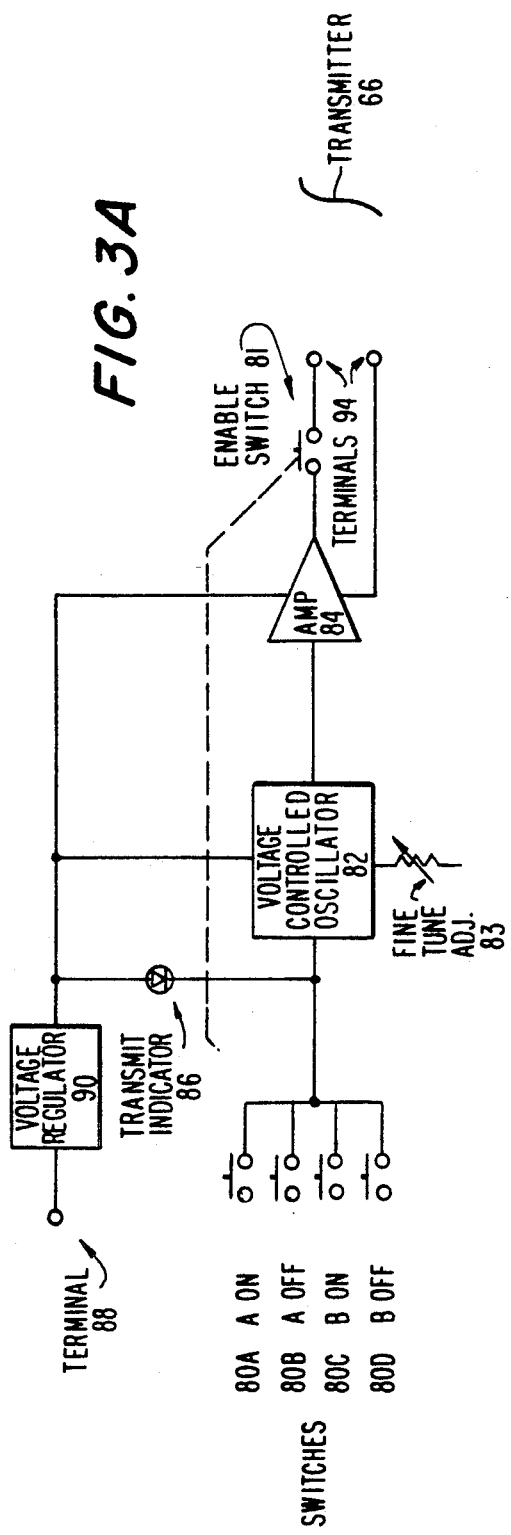
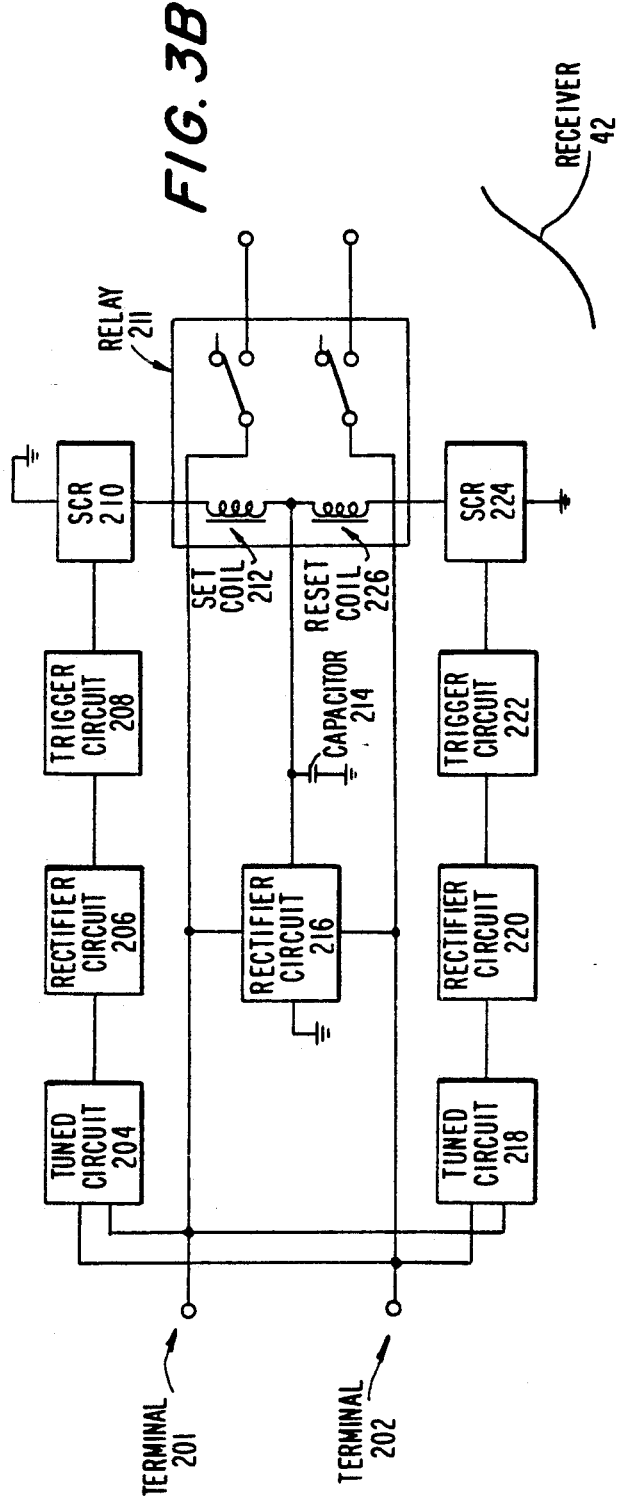

TELEPHONE CONTROLLER APPARATUS

BACKGROUND OF THE INVENTION

1. Field of the Invention

This invention relates to telephone controller apparatus and, more particularly, to such apparatus which enables or disables a selected telephone.

2. Description of the Prior Art

In the prior art, telephone signals are transmitted through telephone lines to a desired telephone which may be located in a home or office. More specifically, as shown in FIG. 1, a telephone signal is transmitted from a sending telephone (not shown) through a telephone line 8, a local telephone line 20 (contained within the home or office), a telephone jack 18 and a cable 12 to a designated telephone 10. In a similar manner, a signal may be transmitted from telephone 10 through the same transmission path to another designated telephone.

Situations may arise when a person having plural extension telephones all coupled to the same local telephone line does not wish telephone signals to be transmitted to or from one or more of his or her telephones. For example, it may be desirable not to have telephone signals transmitted to or from an extension telephone located in a child's room after a certain time. It may also be desirable not to have telephone signals transmitted to an extension telephone located in the same room as someone who is ill, so as not to disturb the person. Further, it may be desirable to disengage extension telephones in an office after business hours so as to prevent the unauthorized use thereof.

In the prior art, signal transmission to or from a particular telephone is typically prevented by disconnecting the telephone from the telephone jack connected thereto, which may be accomplished by disconnecting connectors 14 or 15, shown in FIG. 1, from mating connectors 16 or 17, respectively. In a similar manner, the telephone is made operative by re-connecting the disconnected connector. As is to be appreciated, a telephone jack may have limited accessibility, thereby making the connections and disconnections thereto difficult. As a result, controlling the signal transmission to one or more telephones is inconvenient and time consuming. Further, numerous connections and disconnections from the telephone jack may damage connector 14 and/or mating connector 16 which, in turn, deteriorates the quality of the transmitted signal. Thus, the prior art has failed to provide a means for controlling signal transmission to or from one or more telephones which is convenient to use and of relatively low cost.

OBJECTS AND SUMMARY OF THE INVENTION

An object of the present invention is to provide telephone controller apparatus which overcomes the foregoing problems associated with the prior art.

More specifically, it is an object of the present invention to provide telephone controller apparatus for enabling or disabling a selected telephone by utilizing a control signal having a frequency which corresponds to the desired state of the selected telephone and which is supplied through the telephone lines.

It is yet another object of the present invention to provide telephone controller apparatus as aforementioned which prevents a telephone from being disabled while the telephone is being operated.

An additional object of the present invention is to provide telephone controller apparatus as aforementioned which operates correctly even if the apparatus is wired in reverse, thereby permitting the installation thereof by individuals having no technical skill or ability.

Other objects, features and advantages according to the present invention will become apparent from the following detailed description of the illustrated embodiment when read in conjunction with the accompanying drawings in which corresponding components are identified by the same reference numerals.

In accordance with an aspect of this invention, telephone controller apparatus is provided for selectively controlling the operating state of a telephone, the apparatus comprising a switch device for selecting a desired state of one or more selected telephones connected to a local telephone line, a transmitter device for transmitting a control signal through the local telephone line having a frequency within a predetermined frequency range which corresponds to the desired state of the selected telephone in response to an output signal from the switch device and a receiver device connected to the local telephone line and coupled to the selected telephone for receiving the transmitted control signal from the transmitter device and in response thereto for connecting or disconnecting the selected telephone to or from the telephone line, respectively, thereby controlling the state of the selected telephone.

BRIEF DESCRIPTION OF THE DRAWINGS

FIGS. 3A and 3B are diagrams illustrating a transmitter and a receiver, respectively, according to an embodiment of the present invention;

DETAILED DESCRIPTION OF THE PREFERRED EMBODIMENTS

Figure 1:
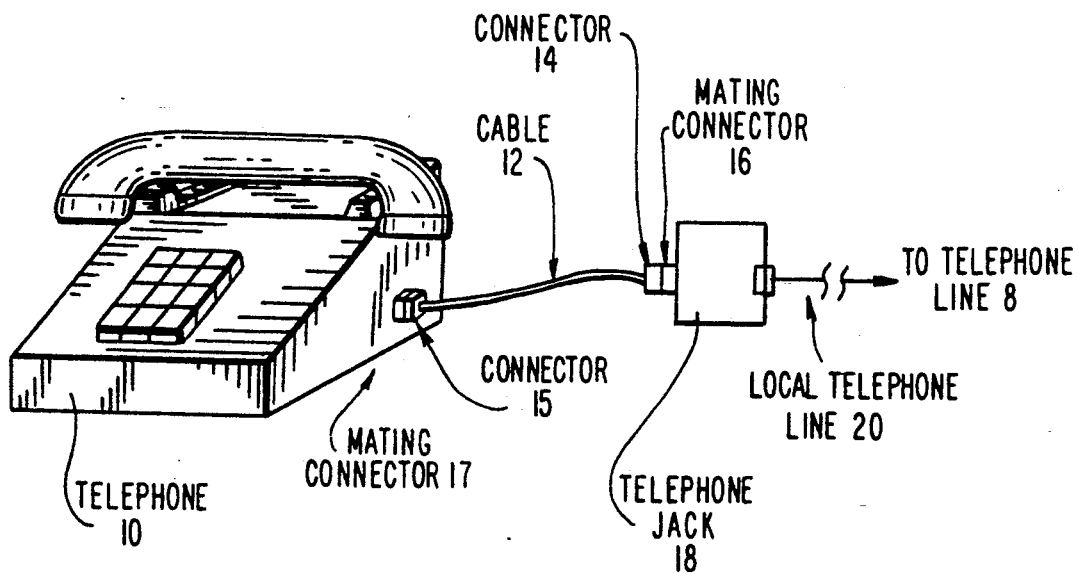
FIG. 1 illustrates a telephone system according to the prior art.
Figure 2:
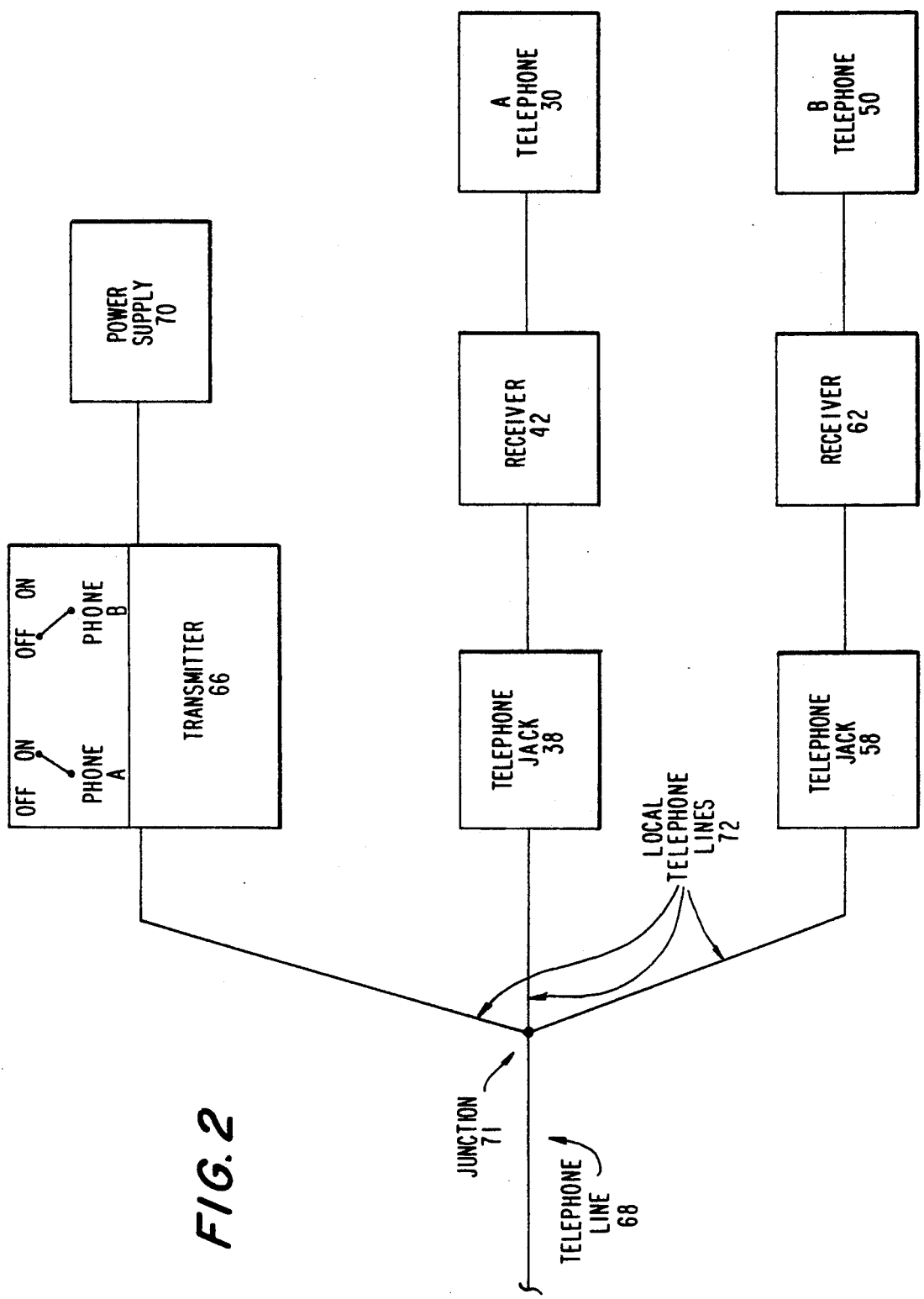
FIG. 2 illustrates a telephone system utilizing a telephone controller apparatus according to an embodiment of the present invention.

FIG. 2 illustrates a telephone system utilizing telephone controller apparatus according to an embodiment of the present invention. As shown in FIG. 2, the telephone system generally comprises telephones 30 and 50, telephone jacks 38 and 58, receivers 42 and 62, and a transmitter 66. Telephone signals are transmitted through a telephone line 68 to a junction 71, whereupon the transmitted signal is supplied in parallel through local telephone lines 72 to telephone jacks 38 and 58. As used herein, a local telephone line is a communication link within a home or office (or other establishment) to which one or more extension telephone instruments may be connected for communication over telephone line 68. As is to be appreciated, these local telephone lines 72 typically contain at least two conductors, normally having green and red colored insulation, respectively, and may contain four conductors, normally having green, red, yellow and black colored insulation, respectively. The green and red conductors of the local telephone lines 72 are connected to two wires, normally identified as the TIP and RING wires, contained within the telephone line 68. Transmitter 66, which receives power from a power supply 70, includes one or more switches which enable a user to select which telephone or telephones are to be connected to or disconnected from the local telephone lines. As an example, the switch settings illustrated in FIG. 2 indicate that telephone A (telephone 30) is connected to the telephone lines whereas, telephone B (telephone 50) is not. In response to each switch activation, transmitter 66 is adapted to transmit a control signal having a predetermined frequency unique to that switch. The control signal from transmitter 66 is supplied through local telephone lines 72 and telephone jacks 38 and 58 to receivers 42 and 62, respectively. Each of receivers 42 and 62 includes a plurality of resonant circuits, which are each tuned to a separate predetermined frequency. Receivers 42 and 62 are adapted to receive the control signal from transmitter 66 and when the frequency of the control signal matches that of a resonant circuit therein, a signal from the respective resonant circuit causes the selected telephone to be appropriately connected or disconnected from the telephone lines. In a preferred embodiment, each of receivers 42 and 62 includes two uniquely tuned resonant circuits, that is, one for connecting and one for disconnecting a selected telephone to or from the local telephone lines.

Telephones 30 and 50 are coupled to receivers 42 and 62, respectively, and, depending upon the switch selections of transmitter 66 as previously described, are adapted to receive telephone signals from telephone line 68 or to transmit telephone signals thereto.

It is to be appreciated that while two telephones are illustrated in FIG. 2, the present invention is not so limited and can be applied to a system employing any number of telephones. The transmitter and receiver for use with the present invention will now be described in more detail with reference to FIGS. 3-5.

Transmitter 66, as illustrated in FIG. 3A, generally comprises switches 80A, 80B, 80C and 80D (hereinafter, switches 80A-D); a voltage controlled oscillator 82; an amplifier 84; a transmit indicator 86 and a voltage regulator 90. Transmitter 66, as shown in FIG. 3A, is configured for use with a telephone system employing two telephones designated as "A" and "B", although as previously mentioned the transmitter is not so limited. In one embodiment, in response to a switch closure, switches 80A-D, which in a preferred embodiment are momentary contact switches, are adapted to supply an output signal therefrom. The output signal from the closed switch is supplied to voltage control oscillator 82, which is adapted to produce a signal having a frequency within a predetermined frequency bandwidth and unique to the selected switch setting. As is to be appreciated, four unique frequencies (for example, 305 kHz, 400 kHz, 475 kHz and 575 kHz) are used to control two telephones, that is, one for enabling and one for disabling each telephone. Thus, when switch 80A is selected, so as to turn "on" telephone A, voltage controlled oscillator 82 produces a signal with a frequency of 305 kHz. In a similar manner, closing switches 80B, 80C and 80D produce signals with frequencies of 400, 475 and 575 kHz, respectively. A fine tune adjuster 83 is coupled to oscillator 82 for adjusting the signal generated by VCO 82 as may be needed.

The signal from oscillator 82 is supplied to amplifier 84 which amplifies the received signal and outputs the same. An enable switch 81, which is ganged to switches 80A-D as indicated by the dashed line, enables the output signal from amplifier 84 to be supplied through terminals 94 to the local telephone line whenever one of switches 80A-D is closed. On the other hand, whenever switches 80A-D are all open, transmitter 66 is disposed in a standby mode and, enable switch 81 is also open thereby disconnecting transmitter 66 from the telephone lines.

Power for driving oscillator 82 and amplifier 84 is supplied from voltage regulator 90, which is adapted to receive a 12 volt D.C. signal from a standard 12 volt wall adapter (not shown) through an input terminal 88 and regulate the same to 9 volts D.C. Voltage regulator 90 also supplies power to transmit indicator 86 which, in turn, is coupled to switches 80A-D and is adapted to provide an indication signal to the user. More specifically, since switches 80A-D are preferably momentary contact switches, it is preferred that they be held for a sufficient time to insure that the receiver, as hereinafter described, has ample time to respond accordingly. Therefore, when a switch 80 is held closed for a time which is sufficient for the receiver to respond, transmit indicator 86 provides an indication of such to the user. In a preferred embodiment, transmit indicator 86 is an LED which is visible to the user.

Figure 4:
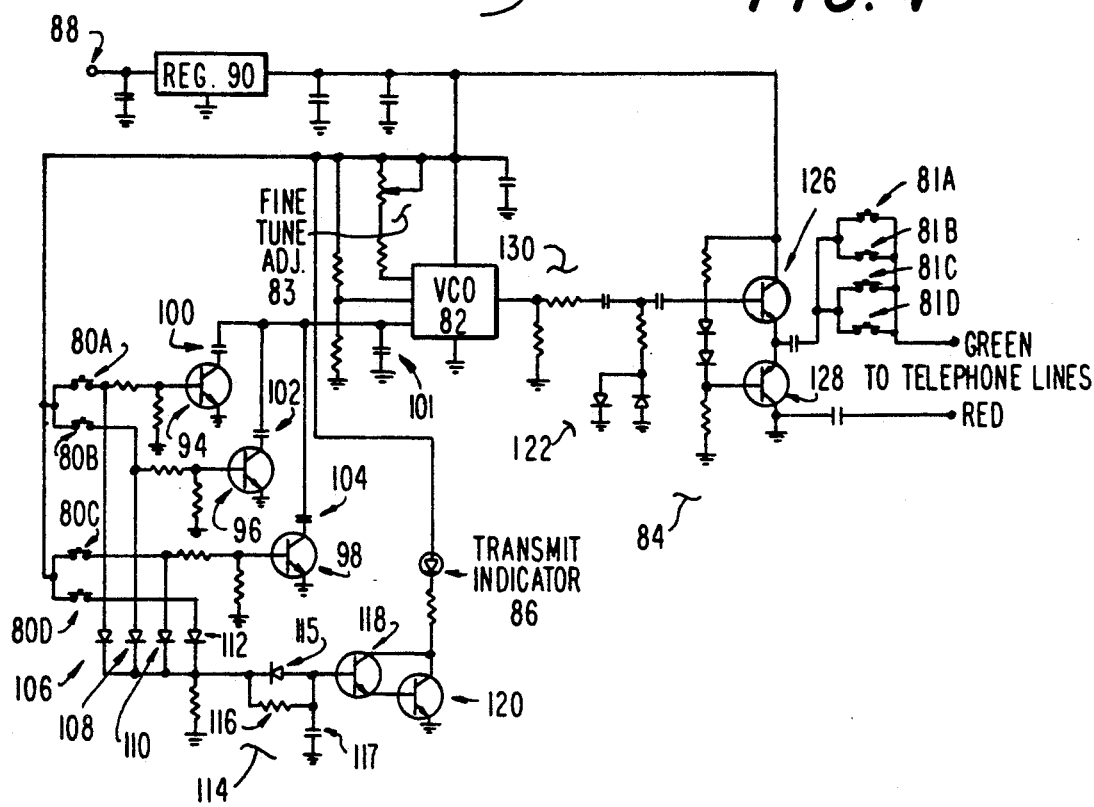
FIG. 4 is a schematic diagram of the transmitter in FIG. 3A.

A schematic diagram of transmitter 66 is shown in FIG. 4. As previously described, a 12 volt D.C. signal is supplied through input terminal 88 to voltage regulator 90 which produces a 9 volt D.C. output signal. The 9 volt D.C. signal is coupled to switches 80A-D, voltage controlled oscillator (VCO) 82, transmit indicator 86 and amplifier 84. Fine tune adjuster 83 is coupled to VCO 82 and is adapted to adjust the frequency of the signal generated thereby as previously mentioned.

Switch 80A is coupled to the base of a transistor 94, in which the emitter thereof is connected to ground and the collector is coupled through capacitor 100 to VCO 82. Switches 80B and 80C are similarly coupled through respective transistors 96 and 98, and capacitors 102 and 104 to VCO 82. A capacitor 101 is coupled to the input of VCO 82 and, thus, to the capacitors connected to the collectors of transistors 94, 96 and 98. This capacitor is included in the frequency determining circuit of the VCO. VCO 82, in turn, is coupled through a resistor network 130 and a shaping network 122 to amplifier 84, which includes transistors 126 and 128. Amplifier 84 is coupled to the local (green and red) telephone lines via switches 81A-D.

Switch 80A is further coupled through a diode 106 to a one-shot circuit 114, which includes a diode 115, a resistor 116, a capacitor 117 and Darlington configured transistors 118, 120. Switches 80 B-D are also coupled through respective diodes 108, 110 and 112 to circuit 114. Upon receipt of a signal from one of switches 80 A-D, circuit 114 is adapted to generate a signal, after a predetermined time period, which turns on transistors 118 and 120. More specifically, capacitor 117 is adapted to store energy received from the selected switch at a rate which is determined by resistor 116 and to thereafter supply the same to the base of transistor 118 so as to turn on transistors 118 and 120. Transistors 118 and 120 are coupled to transmit indicator 86.

The operation of the transmitter shown in FIG. 4 will now be described below.

Upon closing switch 80A, a signal from regulator 90 is supplied to the base of transistor 94 so as to render the transistor conductive, thereby placing capacitors 100 and 101 in parallel with each other. The values of capacitors 100 and 101 are selected such that a signal having a predetermined frequency of, for example, 305 kHz is produced by VCO 82. As such, the capacitance of capacitors 100 and 101 may be 120 and 56 picofarads, respectively. VCO 82 generates a signal having a preferably triangular waveform, which is limited in amplitude by resistor network 130 to a predetermined level, which in a preferred embodiment does not exceed −15 dB volts/135 ohms which is a current FCC requirement. Due to harmonics, the triangular output signal from network 130 is reshaped to a sine wave by shaping network 122. The output signal from shaping network 122 is amplified by amplifier 84 and supplied as a control signal to the local (green and red) telephone lines through switch 81A. That is, closing switch 80A turns transistor 94 "ON" so as to initiate signal processing as previously described and connects the output signal from amplifier 84 to the telephone lines.

In a similar manner, upon closing switch 80B, a signal from regulator 90 is supplied to the base of transistor 96, rendering it conductive and placing capacitors 101 and 102 in parallel, which are selected so that a signal having a predetermined frequency of, for example, 400 kHz is produced by VCO 82. Likewise, closing switch 80C activates transistor 98 and places capacitors 101 and 104 in parallel, thus enabling VCO 82 to produce a signal having a predetermined frequency of, for example, 475 kHz. Closing switch 80D produces a signal from VCO 82 having a predetermined frequency of, for example, 575 kHz, even though no capacitor is placed in parallel with capacitor 101. Further, switches 81B-D are ganged with switches 80B-D such that closing switches 80B-D connects the output signal from amplifier 84 to the local (green and red) telephone lines.

Closing switches 80A-D further supplies a signal from regulator 90 through respective diodes 106, 108, 110 and 112 to one-shot network 114 which, as previously described, supplies an output signal after a predetermined time delay which drives transistors 118 and 120 to activate transmit indicator 86. The predetermined time delay, that is, the time delay which exists between the closure of the selected switch and activation of transmit indicator 86, corresponds to the switch closure time which is sufficient to insure that the receiver had time to respond. Thus, upon activation of transmit indicator 86, a user is made aware that the respective switch was held closed for a time sufficient to insure that the receiver had time to respond.

The individual circuit components without reference designations depicted in FIG. 4 are connected as shown and will not be discussed further, since the connections and values are apparent to those skilled in the art and are not necessary for an understanding of the present invention.

Figure 5:
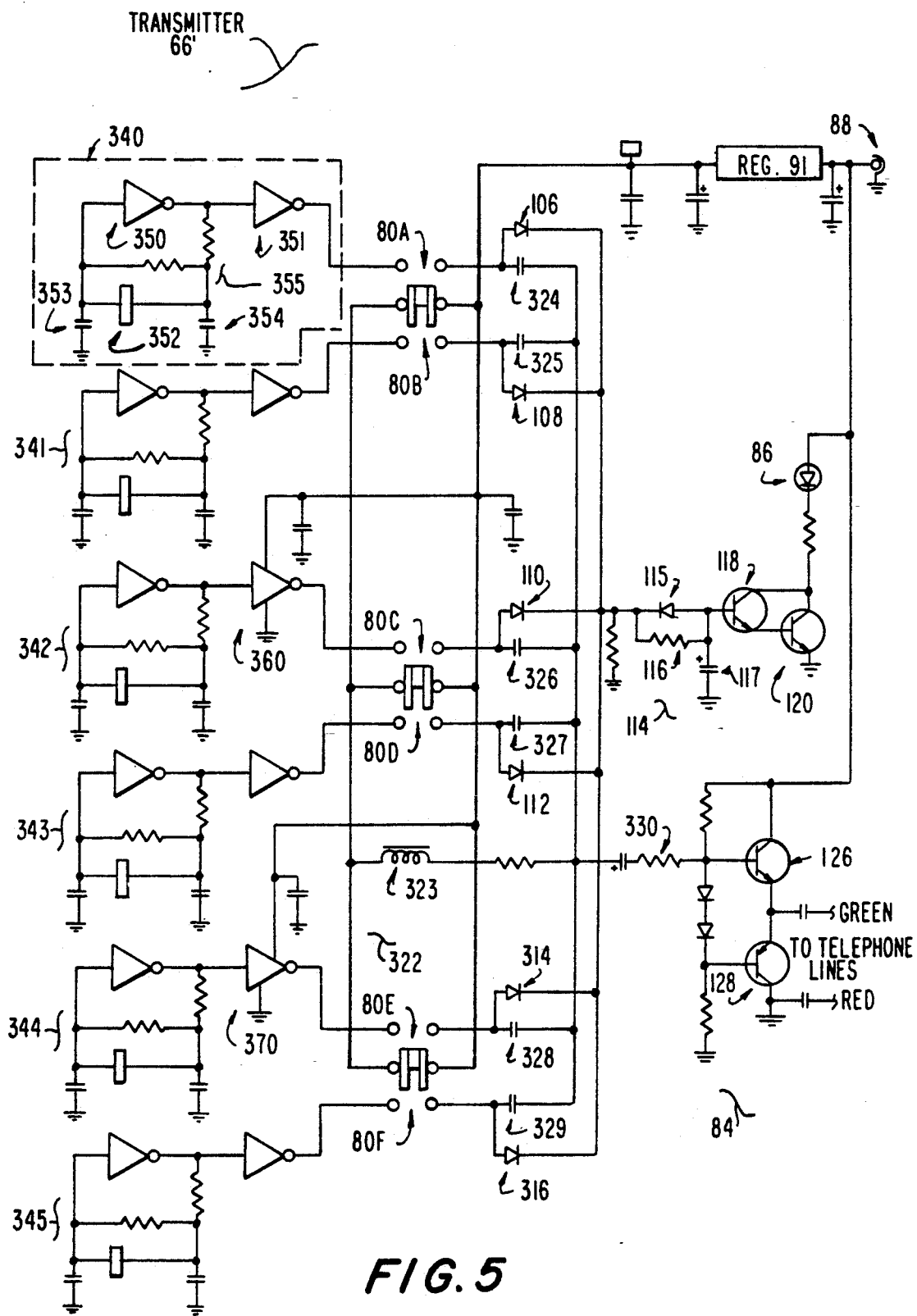
FIG. 5 is a schematic diagram of a transmitter in accordance with a second embodiment of the present invention.

FIG. 5 shows an alternate embodiment of a transmitter in accordance with the present invention which is configured for use with a system using three telephones and comprises similar circuitry and operates in a similar manner to the transmitter shown in FIG. 4 except as described below. It is to be appreciated that elements similar to those in FIG. 4 are identified by the same reference numerals.

As shown in FIG. 5, transmitter 66' generally comprises a regulator 91; switches 80A, 80B, 80C, 80D, 80E and 80F; oscillators 340, 341, 342, 343, 344 and 345; a one shot circuit 114; a transmit indicator 86; a resistor 330; a shaping network 322 and an amplifier 84. Regulator 91 is coupled to switches 80 A-F and inverting buffer amplifiers 360 and 370, and is adapted to produce a regulated voltage (for example, 5 volts) from a voltage applied to an input terminal 88 (such as 12 volts). Switches 80 A-F, which are preferably momentary contact switches, are respectively coupled to oscillators 340 to 345, which are each adapted to supply a square wave signal having a unique predetermined frequency. Oscillator 340, enclosed by the dashed line, generally comprises inverting buffer amplifiers 350 and 351 and a ceramic resonator 352. As shown, inverting buffer amplifiers 350 and 351 are connected in series to switch 80A. Resonator 352, which is adapted to supply a signal having a fixed predetermined frequency, is coupled to a resistor network 355 across amplifier 350. Resonator 352 is further connected through capacitors 353 and 354 to ground. As is to be appreciated, oscillators 341 to 345 are similarly connected and, as such, will not be further described. Further, in a preferred embodiment, the inverting buffer amplifiers included in oscillators 340, 341 and 342 are fabricated on a single integrated circuit chip and, as such, share common power and ground terminals, for example, as shown connected to amplifier 360. In a similar manner, oscillators 343, 344 and 345 also share common power and ground terminals as shown connected to amplifier 370. These connection thus provide operating potential for all of the oscillators.

Switches 80 A-F are connected to shaping network 322 which includes inductor 323 and, depending upon which switch is closed, a respective one of capacitors 324-329 and is adapted to receive the square wave signal from a respective one of oscillators 340-345 and to re-shape the signal to that of a sine wave. More specifically, the shaping network connected to switch 80A includes inductor 323 and capacitor 324, the shaping network connected to switch 80B includes inductor 323 and capacitor 325, and so forth. The output of shaping network 322 is coupled to resistor 330, which is adapted to limit the amplitude of the supplied sine signal to a predetermined value. For example, in a preferred embodiment, the predetermined amplitude is equivalent to −15 db volts/135 ohms which, as previously mentioned, is the maximum amplitude currently allowed by the FCC. The output from resistor 330 is coupled through a amplifier 84, which includes transistors 126 and 128, to the local (green and red) telephone lines.

Switches 80 A-F are further coupled through diodes 106, 114, which includes a diode 115, a resistor 116 and a capacitor 117. The output from circuit 114 is connected through Darlington transistors 118 and 120 to transmit indicator 86 which, in turn, is coupled to input terminal 88 to receive operating voltage therefrom. Terminal 88 is further coupled to amplifier 84.

As previously mentioned, the transmitter shown in FIG. 5 operates similarly to the transmitter in FIG. 4 except as noted below:

A 12 volt D.C. signal is applied from a standard 12 V D.C. wall adapter (not shown) through input terminal 88 to regulator 91, whereupon the signal is regulated to 5 volts D.C. and supplied to the inverting buffer amplifiers included in oscillators 340-345. This 5 volt operating potential activates oscillators 340-345, whereupon each oscillator generates a square wave signal having a unique predetermined frequency. For example, the frequencies of the signals generated by oscillators 340-345 may be 375 kHz, 450 kHz, 525 kHz, 630 kHz, 705 kHz and 780 kHz, respectively.

Upon closing one of switches 80A-F, the square wave signal from the selected oscillator is supplied through the respective switch 80 A-F to shaping network 322, whereupon the signal is converted to a sine wave signal having the same frequency as the square wave signal. The sine wave signal from network 322 is supplied to resistor 330, wherein the amplitude of the signal is limited to a predetermined value which, as previously mentioned, is preferably equivalent to −15dbv/135 ohms. The output signal from resistor 330 is supplied through amplifier 84 to the local (green and red) telephone lines, whereupon the signal is transmitted to all receivers which are connected to the local telephone lines. The square wave signal from the selected oscillator supplied through the respective switch 80 A-F is further supplied through respective diodes 106, 108, 110, 112, 314 and 316, one shot network 114 and transistors 118 and 120 to transmit indicator 86 in a manner similar to that described with reference to the transmitter of FIG. 4.

FIG. 3B illustrates in block form a receiver in accordance with an embodiment of the present invention. As receivers 42 and 62 (FIG. 2) are similarly constructed, only a description of receiver 42 will be provided. As shown, receiver 42 is generally comprised of tuned circuits 204 and 218, rectifier circuits 206, 216 and 220, trigger circuits 208 and 222, silicon control rectifiers (SCR) 210 and 224, and a double pole double throw relay 211. An input signal from the local telephone lines is received by input terminals 201 and 202 and simultaneously supplied to tuned circuits 204 and 218, which are each adapted to detect a signal having a predetermined and unique frequency. As the output signals from circuits 204 and 218 are processed in a substantially similar manner, only one processing path will be described.

An output signal from tuned circuit 204 is supplied to rectifier circuit 206, which supplies a rectified signal to trigger circuit 208. In response to the rectified signal supplied thereto, trigger 208 is adapted to supply a trigger signal to SCR 210, which is coupled to a set coil 212 contained within double pole double throw (DPDT) relay 211.

The input signal from terminals 201 and 202 is further coupled to rectifier circuit 216 which supplies a rectified output to a capacitor 214. Capacitor 214 has one terminal connected to ground and is adapted to store energy received from circuit 216 and supply the same to relay 211.

As previously mentioned, rectifier circuit 220, trigger circuit 222, SCR 224 and reset coil 226 are similarly connected and, as such, will not be further described.

The operation of receiver 42 described above with reference to FIG. 3B is as follows:

An input control signal transmitted by transmitter 66 (FIG. 3A), through the local telephone lines is received at input terminals 201 and 202. The received control signal is simultaneously supplied to tuned circuits 204 and 218, each of which is tuned to a respective predetermined and unique frequency which matches one of the frequencies produced by VCO 82 (FIG. 3A). For example, tuned circuits 204 and 218 may be tuned to frequencies of 305 kHz and 400 kHz, and are thereby adapted to turn telephone A on and off, respectively. Thus, if the input control signal has a frequency of, for example, 305 kHz, the signal is detected by tuned circuit 204 whereupon, the signal is passed therefrom, rectified and supplied to trigger circuit 208. Upon receipt of the rectified signal, trigger circuit 208 is activated to supply a trigger signal to SCR 210. As a result, SCR 210 is rendered conductive to activate set coil 212, thereby connecting telephone A to the telephone lines.

On the other hand, if the input control signal has a frequency of 400 kHz, the signal is detected by tuned circuit 218 and passed to rectifier circuit 220 which activates trigger circuit 222 to turn on SCR 224, in a manner similar to that previously described, so as to activate reset coil 226, thereby disconnecting telephone A from the local telephone line.

As is to be appreciated, if the frequency of the input control signal is neither 305 kHz nor 400 kHz, the control signal is not detected by either tuned circuit 204 or tuned circuit 218, whereupon telephone A remains in its current state (i.e. either connected to or disconnected from the local telephone lines).

As hereinafter described, rectifier circuit 216 is adapted to ensure that receiver 42 will operate properly even if the connection to the local telephone lines is wired in reverse. Capacitor 214, which receives an output signal from rectifier 216, charges to a predetermined voltage level only when the telephone attached to the output of receiver 42 is in an on hook condition, that is, only when its respective switch hook is closed. As a result, the voltage stored on capacitor 214 maintains set coil 212 and reset coil 226 in their present state when the attached telephone is on hook, thereby eliminating the need for a separate power supply for receiver 42. On the other hand, when the telephone attached to the output of receiver 42 is off hook, the voltage across capacitor 214 is relatively low which prevents the telephone from being turned off while in use (i.e. while off hook).

Figure 6:
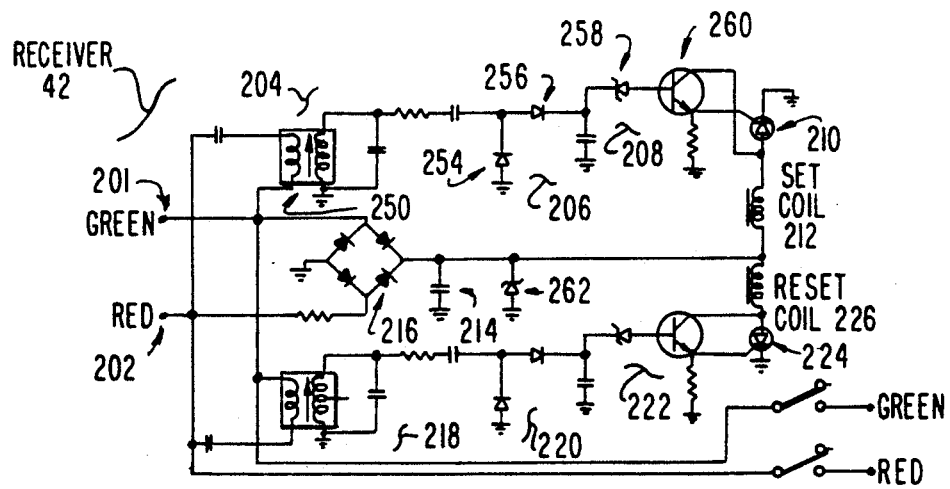
FIG. 6 is a schematic diagram of the receiver in FIG. 3B.

A schematic diagram of the receiver illustrated in FIG. 3B is shown in FIG. 6. As a general description of receiver 42 and the operation thereof was discussed above, the following discussion is primarily directed to the individual components which were not depicted in FIG. 3B and, as such, were not discussed. Further, as previously described, receiver 42 includes two similar processing portions and, for brevity, only one portion, that is, the portion which activates set coil 212 will be described.

An input control signal transmitted by transmitter 66 (FIG. 3A) through the local (green and red) telephone lines is received at terminals 201 and 202 and supplied to the primary winding of a tuned transformer 250 which is included in tuned circuit 204. Tuned transformer 250 is tuned to a unique predetermined frequency which is substantially the same as one of the control signal frequencies supplied from transmitter 66, for example, 305 kHz. Upon receipt of the control signal, tuned transformer 250 is adapted to determine if the frequency of the control signal matches the tuned frequency. If a match is detected, further processing continues. On the other hand, if a match is not detected, the control signal is not supplied through transformer 250 and further processing is not initiated. Transformer 250 has an internal impedance matched to the impedance of the local telephone lines connected to terminals 201 and 202. A signal from the secondary windings of transformer 250 is supplied through rectifier circuit 206, which includes diodes 254 and 256, to trigger circuit 208. Trigger circuit 208 includes a Zener diode 258 (or other avalanche breakdown device) which is adapted to sense the voltage level supplied from rectifier circuit 206 and, when the voltage level reaches a predetermined value, to supply the same to the base of transistor 260 so as to render it conductive. As a result, a signal is supplied from transistor 260 to SCR 210 which activates set coil 212, thereby connecting telephone A to the telephone lines.

The input signal from terminals 201 and 202 is further supplied to rectifier circuit 216 which, in a preferred embodiment, includes a full wave diode bridge to ensure that an acceptable D.C. signal is provided therefrom regardless of the orientation of the telephone line connections to receiver 42. An output signal from rectifier circuit 216 is connected to capacitor 214 and a Zener diode 262 (or other avalanche breakdown device) which limits the voltage level across capacitor 214 to a predetermined value, which in a preferred embodiment is approximately 27 volts. This voltage is applied to set coil 212.

As previously stated, the portion of receiver 42 for activating reset coil 226 is similarly connected. That is, if the frequency of the input control signal supplied to terminals 201 and 202 matches that of circuit 218, the control signal is received through circuit 218 and processed through rectifier circuit 220, trigger circuit 222 and SCR 224 so as to activate reset coil 226, thereby disconnecting telephone A from the telephone line.

The individual circuit components without reference designations depicted in FIG. 6 are connected as shown and will not be discussed further, since the connections and values are apparent to those skilled in the art and are not necessary for an understanding of the present invention.

While receiver 42 illustrated in FIGS. 3B and 6 was described for controlling telephone A, wherein as shown in FIG. 3A the "on" and "off" frequencies were selected as 305 kHz and 400 kHz, respectively, it is to be appreciated that by selecting the frequencies of tuned circuits 204 and 218 to be 4.75 and 575 kHz, respectively, the receiver can be utilized as receiver 62 (FIG. 2) so as to control telephone B. Similarly, in a three telephone system, that is, when using transmitter 66' (FIG. 5), three of the receivers shown in FIGS. 3B and 6 are used in which the tuned circuits 204 and 218 have frequencies of 375 kHz and 450 kHz, 525 kHz and 630 kHz, and 705 kHz and 780 kHz, respectively. Thus, it is to be appreciated that while embodiments of the present invention were described for use with two or three telephones, any number of telephones can be utilized by merely selecting other frequencies.

Although a preferred embodiment of the present invention has been described in detail herein, it is to be understood that this invention is not limited to that precise embodiment, and that many modifications and variations may be effected by one skilled in the art without departing from the spirit and scope of the invention as defined by the appended claims.

I claim:

1. Apparatus for selectively enabling/disabling one or more of a plurality of telephones, said plurality of telephones being coupled to two local telephone lines for supplying voice communication thereto and therefrom, said apparatus comprising:

switch means for producing a respective output signal for enabling or disabling each selected telephone;

transmitter means for transmitting control signals through said two local telephone lines which supply voice communication to and from said telephones, in which said transmitter means transmits a respective one of said control signals in response to each said output signal from said switch means and in which each of said control signals has a respective frequency within a predetermined frequency range which corresponds to the enabling or disabling of the selected telephone; and a plurality of receiver means connected to said two local telephone lines which supply voice communication to and from said telephones, each said receiver means being respectively coupled to one of said telephones and including a plurality of resonant circuits each tuned to a respective frequency corresponding to one of enabling or disabling of the respective telephone coupled thereto and in which each said receiver means receives each of the transmitted control signals from said transmitter means so as to selectively connect or disconnect each selected telephone to or from said two local telephone lines, respectively, in response to each of said transmitted control signals, thereby enabling or disabling each selected telephone, each said receiver means further including means for maintaining the connection to or disconnection from said two local telephone lines of the selected telephone coupled thereto so as to be enabled or disabled until the respective receiver means receives another transmitted control signal which corresponds to the other of the respective enabling or disabling.

2. Apparatus as set forth in claim 1, in which said transmitter means includes oscillator means.

3. Apparatus as set forth in claim 2, in which said oscillator means includes a resonator.

4. Apparatus as set forth in claim 2, in which said oscillator means includes a voltage controlled oscillator.

5. Apparatus as set forth in claim 1, in which said switch means includes at least one momentary contact switch for each of said telephones.

6. Apparatus as set forth in claim 5, in which said transmitter means further includes indicator means for indicating to a user that said momentary contact switch has been held for a time sufficient for the respective one of said receiver means to respond to the transmitted control signal.

7. Apparatus as set forth in claim 1, in which said predetermined frequency range is within the frequency range of 300 kHz to 800 kHz.

8. Apparatus as set forth in claim 1, in which each of said resonant circuits is tuned to a unique predetermined frequency which is substantially the same as one of the signal frequencies of said control signals from said transmitter means.

9. Apparatus as set forth in claim 1, in which said transmitter means includes means to limit each of said control signals to a predetermined maximum amplitude.

10. Apparatus as set forth in claim 9, in which said predetermined maximum amplitude is −15 db volts/135 ohms.

11. Apparatus for transmitting unmodulated control signals to a plurality of remote locations each having a telephone located thereat by way of two local telephone lines which supply voice communication to and from each of the telephones for enabling or disabling a selected one or more of said telephones at the remote location or locations corresponding thereto, in which each of said un-modulated control signals has a respective frequency within a predetermined frequency range which corresponds to the enabling or disabling of the selected telephone or telephones, said apparatus comprising:

switch means for producing a respective output signal for enabling or disabling each selected telephone;

oscillator means for generating a signal having a respective frequency in response to each said output signal from said switch means;

amplifier means for receiving and amplifying each said signal from said oscillator means so as to form respective ones of said un-modulated control signals; and output means coupled to said amplifier means for supplying each of said un-modulated control signals to said plurality of remote locations by way of said two local telephone lines which supply voice communication to and from each of said telephones so as to enable or disable each selected telephone.

12. Apparatus as set forth in claim 11, in which said predetermined frequency range is within the frequency range of 300 kHz to 800 kHz.

13. Apparatus as set forth in claim 11, in which said switch means includes at least one momentary contact switch for each of said telephones.

14. Apparatus as set forth in claim 13, further comprising indicator means coupled to said switch means for indicating that the respective momentary contact switch has been held for a predetermined time sufficient for the respective one of said un-modulated control signals to be transmitted to said plurality of remote locations so as to enable or disable the selected telephone.

15. Apparatus as set forth in claim 11, further comprising amplitude limiting means coupled to said oscillator means for limiting the amplitude of each said signals generated by said oscillator means to a predetermined value.

16. Apparatus as set forth in claim 15, in which said predetermined value is −15 db volts/135 ohms.

17. In a telephone system having a plurality of telephones coupled to two local telephone lines which supply voice communication thereto and therefrom, each of said telephones is coupled to an apparatus for receiving control signals transmitted by way of said two local telephone lines which supply voice communication to and from said telephones, in which each of said control signals has a respective frequency which corresponds to enabling or disabling of a selected one of said telephones, each said apparatus comprising:

input means coupled to said two local telephone lines which supply voice communication to and from said telephones for receiving said control signals;

a plurality of resonant circuit means coupled to said input means each tuned to a respective predetermined frequency corresponding to one of enabling or disabling of the telephone coupled to the respective apparatus and which is substantially the same as one of the frequencies of said control signals for passing a control signal having said respective predetermined frequency and rejecting control signals having other frequencies; and switch means for respectively connecting or disconnecting the telephone coupled to the respective apparatus to or from said two local telephone lines when a control signal is passed by one of the resonant circuit means, thereby enabling or disabling the selected telephone, and including means for maintaining the connection to or disconnection from said two local telephone lines of the selected telephone so as to be enabled or disabled until another control signal which corresponds to the other of the respective enabling or disabling is received by said input means and passed by one of the resonant circuit means to said switch means.

18. Apparatus as set forth in claim 17, in which each of said resonant circuit means includes a transformed tuned to the respective predetermined frequency.

19. Apparatus as set forth in claim 18, in which each of said resonant circuit means further includes rectifier means coupled to the respective transformer for rectifying a signal passed thereby, and trigger means for receiving the rectified signal and generating a trigger signal.

20. Apparatus as set forth in claim 19, in which said switch means comprises SCR means responsive to said trigger signal and relay means activated by said SCR means.

21. Apparatus as set forth in claim 20, in which said input means includes a full wave diode bridge for ensuring that an acceptable signal is supplied therefrom.

* * * * *